UNITED STATES PATENT OFFICE.

WILHELM HERZBERG AND OTTO HANSMANN, OF BERLIN, GERMANY, ASSIGNORS TO THE ACTIEN-GESELLSCHAFT FÜR ANILIN FABRIKATION, OF SAME PLACE.

BLACK AZO DYE.

SPECIFICATION forming part of Letters Patent No. 583,439, dated May 25, 1897.

Application filed October 23, 1896. Serial No. 609,856. (Specimens.)

*To all whom it may concern:*

Be it known that we, WILHELM HERZBERG and OTTO HANSMANN, of Berlin, in the Kingdom of Prussia, German Empire, have invented new and useful Improvements in the Manufacture of Black Dye; and we do hereby declare that the following is a full, clear, and exact description of the invention, which will enable others skilled in the art to which it appertains to make and use the same.

The invention relates to the production of a valuable black azo coloring-matter possessing the formula

and is based on the following observations.

We have discovered that by rediazotizing the compound produced by the action of diazotized picramic acid on alpha$_1$-naphthylamin-beta$_3$-monosulfonic acid and by combining the diazo compound thus obtained with beta-napthol an azo compound is produced, which is represented by the constitutional formula

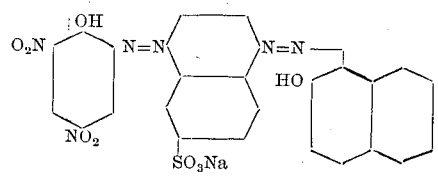

and which has been found to be a most valuable dyestuff, producing on wool blackish-violet tints which by subsequent treatment with chromium salts are converted into a deep black distinguished by its fastness to fulling and to the action of alkalies, acids, and light.

For practically carrying out our invention we may proceed as follows: 22.1 kilograms of the soda salt of picramic acid are diazotized. The diazo compound is then allowed to run into a solution of 22.3 kilograms of alpha$_1$-naphthylamin-beta$_3$-monosulfonic acid, to which solution an excess of acetate of soda has been added. The azo compound thus formed is rediazotized by means of hydrochloric acid and a solution of seven kilograms of nitrite of soda. The diazo compound separates as a dark-colored precipitate and is then allowed to flow into a caustic alkaline solution of 14.4 kilograms of beta-naphthol. The coloring-matter is formed rapidly and separates as a bluish-green precipitate, which is filtered off, pressed, and dried. It forms a dark-brown powder of a metallic luster, whose solution in hot water has a dark-bluish-violet color. Soda-lye produces a dark-greenish-blue precipitate, while acids precipitate the coloring-acid as dark-bluish-violet flakes. The dye-stuff is but sparingly soluble in alcohol with a bluish-violet color. The solution in concentrated sulfuric acid has a blackish-violet shade.

The following alteration may be made in the above example without materially changing the character of the product obtained: Instead of pure alpha$_1$-naphthylamin-beta$_3$-sulfonic acid its mixture with alpha$_1$-naphthylamin-beta$_4$-sulfonic acid may be used, which mixture is known as "Cleve's" naphthylaminsulfonic acid.

Having now described our invention, what we claim is—

The hereinbefore-described azo dye represented by the constitutional formula

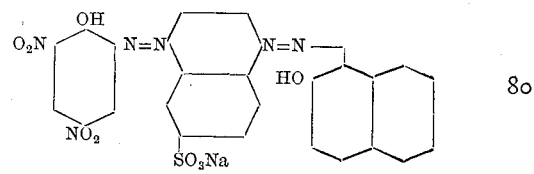

which dye forms a dark-brown powder of a metallic luster soluble in hot water with a dark-bluish-violet color, in which solution soda-lye produces a dark-greenish-blue precipitate, while acids precipitate the coloring-acid as dark-bluish-violet flakes, said dye being sparingly soluble in alcohol with a bluish-violet color and in concentrated sulfuric acid with a blackish-violet color, the aforesaid dye producing on wool blackish-violet tints which by subsequent treatment with chromium salts are converted into fast deep black shades.

In testimony whereof we hereunto set our hands and affix our seals, in the presence of two witnesses, this third day of October, A. D. 1896.

WILHELM HERZBERG. [L. S.]
OTTO HANSMANN. [L. S.]

Witnesses:
  WALTER KARSTEN,
  GUSTAV LUCHT.